Figure 1:
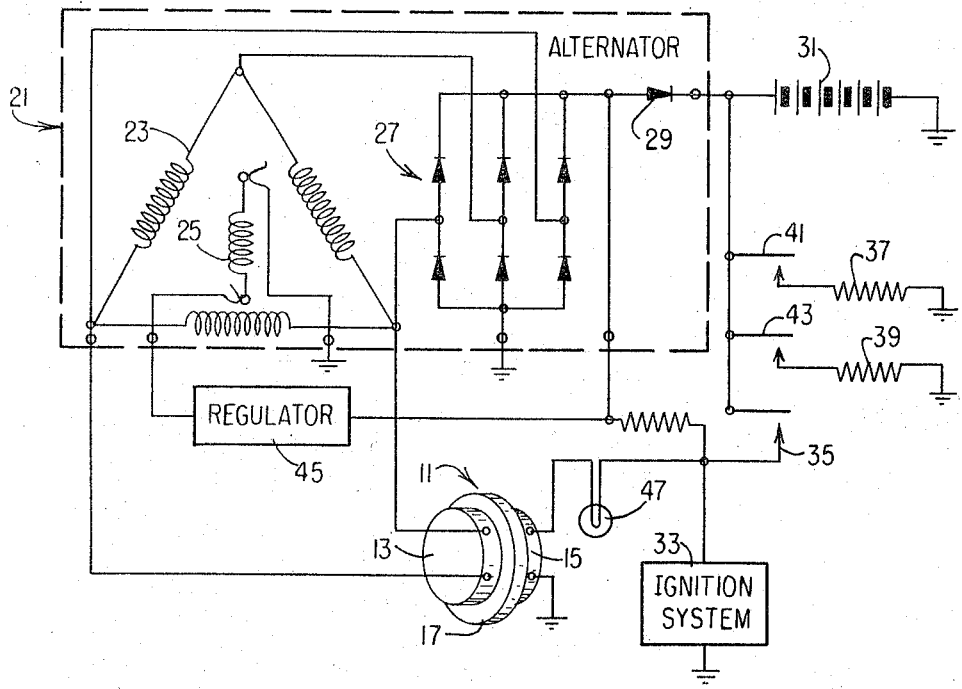

Feb. 28, 1967 R. T. RACE 3,307,167
ELECTRICAL CONTROL CIRCUIT INCLUDING INDIRECTLY
HEATED THERMISTOR PROVIDING ABRUPT CHANGE
IN RESISTANCE WITH TEMPERATURE
Filed Dec. 6, 1963

INVENTOR.
RICHARD T. RACE
BY
*Mueller & Nichols*
ATTYS.

United States Patent Office 3,307,167
Patented Feb. 28, 1967

3,307,167
ELECTRICAL CONTROL CIRCUIT INCLUD-
ING INDIRECTLY HEATED THERMISTOR
PROVIDING ABRUPT CHANGE IN RESIST-
ANCE WITH TEMPERATURE
Richard T. Race, Chicago, Ill., assignor to Motorola,
Inc., Franklin Park, Ill., a corporation of Illinois
Filed Dec. 6, 1963, Ser. No. 328,699
4 Claims. (Cl. 340—253)

This invention relates to relay devices and more particularly to a relay device which has no moving parts or mechanical contacts.

Although conventional mechanical relays are used in a great many applications, there are certain circumstances which render such relays unsatisfactory. For example, a mechanical relay includes a pair of movable contacts which open and close the controlled circuit. Such contacts are susceptible to the accumulation of dirt, to corrosion, and to wear, all of which can culminate in faulty operation. Accordingly, when mechanical relays are used in applications wherein there are long periods of nonuse, such as in emergency lighting systems or alarm systems, the possibility of faulty operation greatly increases. Corrosion or accumulation of dirt would go unnoticed until the moment the relay is required to function, which could prove disastrous in an emergency.

Another application where conventional mechanical relays may be unsatisfactory is in a corrosive atmosphere such as at sea, where reliability would be questionable due to rapid corrosion. And if used in an explosive atmosphere, sparking of the contacts could result in an explosion. Often such relays are hermetically sealed but this may be expensive. For these reasons, it is desirable that a relay be developed which avoids the need for mechanical contacts.

Accordingly, it is an object of this invention to provide an improved relay device.

Another object of the invention is to provide a relay device which utilizes no moving parts or mechanical contacts.

Still another object of the invention is to provide a contactless relay which is capable of performing the functions of conventional mechanical relays of the inductive or thermal type.

A feature of the invention is the provision of a relay device including a thermistor connectable in a controlled circuit and positioned to be heated by a heating element responsive to control power, with the thermistor providing an abrupt change in resistance after being heated a predetermined amount to alter current flow in the controlled circuit.

Another feature of the invention is the provision, in a control device, of first and second positive temperature coefficient resistors in thermal proximity, with the first being self-heating and having a higher Curie point than the second and controlling the second such that the second is responsive to current applied to the first.

Still another feature of the invention is the provision of a control device coupling first and second circuits and comprising a thermistor connected in the first circuit and positioned to be heated by a heating element responsive to control power in the second circuit, with the thermistor providing an abrupt change in resistance after being heated a predetermined amount to alter current flow in the first circuit.

Figure 2:
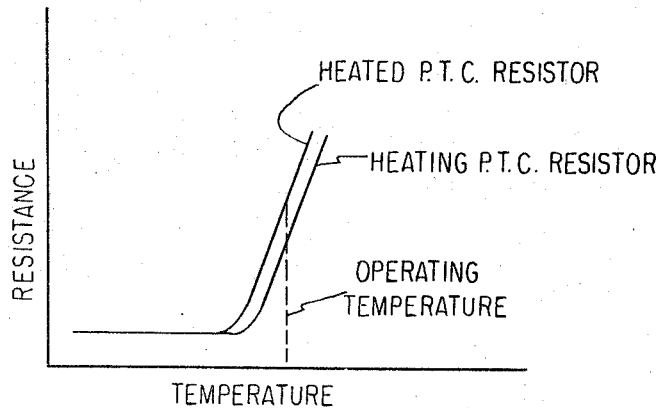

In the drawing:

FIG. 1 is a combined schematic diagram and perspective view representing an electrical system incorporating the invention; and FIG. 2 is a graphical representation of the characteristics of the invention.

In accordance with the invention, a relay device is provided which is responsive to a control signal applied thereto to alter the current flowing in a controlled circuit. The device includes a power responsive heating element which may be a positive temperature coefficient self-heating resistor connected to have control current applied thereto. A thermistor which provides an abrupt change in resistance within a given temperature range relative to its change in resistance outside the given range is mounted in thermal proximity to the heating element. This thermistor may be a positive temperature coefficient resistor having an abrupt increase in resistance at the Curie point. Heat conductive material may be used to thermally couple the two. As control power is applied to the heating element, the temperature of the thermistor rises into the given range at which point the resistance thereof changes radically. When the thermistor is a positive temperature coefficient resistor, such radical change in resistance will effectively open the controlled circuit. On the other hand, if the thermistor is a negative temperature coefficient resistor exhibiting such a characteristic, the abrupt reduction in the resistance of the controlled circuit will effectively act as closing contacts in a conventional mechanical relay.

Referring now to FIG. 1, the control device 11 of the invention is shown in perspective. Control device 11 includes a pair of wafer shaped positive temperature coefficient (P.T.C.) resistors 13 and 15 separated by a layer of heat conductive material 17. The temperature coefficient of a positive temperature coefficient resistor increases considerably at a certain "Curie" point (i.e. changes of 10 percent per degree centigrade are normal). Below the Curie point the change in resistance with temperature may be relatively insignificant. This Curie point may actually be a relatively small range of temperatures rather than a single point. For the purposes of this specification and claims, the term thermistor is to be taken as defining any resistor which exhibits a relatively high change in resistance with changing temperature. Such a thermistor could be a resistor having negative or positive temperature coefficients.

Control current applied to P.T.C. resistor 13, which is self-heating, will cause resistor 13 to heat. Heat from resistor 13 is transferred to P.T.C. resistor 15 through heat conductive material 17 to raise the temperature of resistor 15. If current is applied to resistor 13 for sufficient duration and is of sufficient magnitude, resistor 15 will be heated beyond its Curie point causing an abrupt increase in its resistance. If resistor 15 is connected in a controlled circuit it will be seen that the current in the controlled circuit may be controlled according to the current applied to resistor 13. Resistor 13 may be self-limiting. That is, the resistance will rise to a point where the power applied is equal to the heat dissipated to hold the temperature and resistance of resistor 13 constant.

Referring to FIG. 2, if the Curie point of the heating resistor 13 is selected to be slightly higher than the Curie point of the heated resistor 15, it will be seen that as resistor 13 becomes self-limiting at a point beyond its Curie point, the resistance of resistor 15 will be held at a fairly constant value according to the heat applied thereto by resistor 13. If the operating temperature of resistor 15 is selected to be at a sufficiently high level, ambient temperature will have little effect on the operation of the device other than to affect the time required for the device to trigger.

The uses of such devices are many and varied and such devices may prove far more satisfactory than conventional mechanical relays in certain circumstances. For example, alarm circuits or emergency lighting circuits may often remain unenergized for long periods of time, but must be relied upon to function properly when needed. Mechanical relays may corrode or become dirty over long periods of time and hence could be unreliable in such uses. This problem is not present in devices constructed in accordance with the invention. The invention may also prove useful in highly corrosive atmospheres which would quickly damage mechanical contacts, or in explosive atmospheres where sparking between mechanical contacts could be dangerous. The device of the invention may be constructed for operation with A.C. or D.C. and will provide complete electrical isolation between controlling and controlled circuits. The device furthermore will perform any task which heretofore has been performed by mechanical relays of either the inductive or thermal relay type (bimetal devices).

The thermal inertia of the device will depend generally upon the size of the device and the heat sinking thereof. Accordingly, devices of the invention could be manufactured as a single two part wafer of very small dimensions to reduce the thermal inertia to a point where the relay would close immediately. Such devices could conceivably be constructed as integrated semiconductor structures when the state of the art makes such a step feasible. If the thermal inertia of the device is kept low, the effect of ambient temperature may be minimized.

An especially significant use of devices constructed in accordance with the invention is where a time delay is desirable between the application of control current and the effect on the controlled circuit. With a sufficiently high thermal inertia, undesirable transient signals may be integrated out. A further use of the invention might be in the power supply of certain electronic apparatus. Often it is desirable in electronic apparatus, such as television sets, to delay the application of B+ potential to the tubes until the filaments are sufficiently hot. A relay in accordance with the invention could be constructed to provide the necessary time delay. Such devices could also be utilized as oscillators to provide a wide variation of relaxation periods. Such oscillators mght be incorporated, for example, in flasher lights and turn indicators for automobiles.

Returning now to FIG. 1, the device 11 is shown incorporated in a vehicular electrical system using a warning light to indicate when the storage battery is not being charged. An alternator 21 includes an armature winding 23 connected in delta and a rotating field winding 25. The output of armature winding 23 is applied through a series of rectifier pairs 27 and through an isolation diode 29 to a storage battery 31 for charging the same. Storage battery 31 is connected to an ignition system 33 through an ignition switch 35. Resistors 37 and 39 connected to storage battery 31 through switches 41 and 43, respectively, represent various accessories of the automotive electrical system such as the headlights, radio, etc. Output current from alternator 21 is also passed through a regulator 45 to the field winding 25 for energizing the same.

Battery 31 is connected through a warning light 47 and through P.T.C. resistor 15 to ground. When P.T.C. resistor 15 is below its Curie point, warning light 47 will be energized to indicate that battery 31 is not being charged by alternator 21. P.T.C. resistor 13 is connected across one leg of delta armature winding 23 and accordingly, the current applied across resistor 13 will be proportional to the current output of alternator 21 to battery 31. The Curie points of resistors 13 and 15 are selected such that when the output of alternator 21 attains a sufficient value, heating of resistor 13 will raise the temperature of resistor 15 beyond its Curie point. As a result, the resistance of resistor 15 abruptly increases to extinguish warning light 47, thus indicating that the storage battery 31 is being charged by alternator 21.

It may therefore be seen that the invention provides a contactless relay which may be utilized for nearly all tasks performed by conventional mechanical relays but which entirely eliminates the disadvantages associated with conventional relays due to mechanical contacts. The device is responsive to either A.C. or D.C. and its reaction time may be varied over a wide range. Other devices besides P.T.C. resistors may be utilized in the device of the invention provided the heated thermistor exhibits the characteristic of providing an abrupt change in resistance within a given temperature range relative to its change in resistance outside the given range.

I claim:

1. A control device responsive to control power applied thereto to alter the current flowing in a controlled circuit including in combination, a first self-heating positive temperature coefficient thermistor, a first control circuit connected to said first thermistor to apply control current thereto for heating the same, a second thermistor providing an abrupt change in resistance within a given temperature range relative to its change in resistance outside the given range, heat conductive means thermally coupling said first and second thermistors to cause said second thermistor to be heated by said first thermistor to a temperature in the given range upon application of control power of predetermined value to said first thermistor, a second controlled circuit electrically isolated from said first control circuit, and means connecting said second thermistor in said controlled circuit to control the flow of current therein according to the resistance of said second thermistor, whereby control power of predetermined value applied to said first thermistor by said first circuit will cause said second thermistor to abruptly change its resistance to alter the flow of current in said controlled circuit.

2. Electrical apparatus having a current responsive warning light, including in combination, a first circuit, a first positive temperature coefficient self-heating thermistor connected in said first circuit to be heated by passage of current therethrough, a warning light, a second circuit electrically isolated from said first control circuit and connected to energize said warning light, a second positive temperature coefficient thermistor connected in series with said warning light in said second circuit and providing an abrupt change in resistance within a given temperature range relative to its change in resistance outside the given range, heat conductive means thermally coupling said first and second thermistors to cause heating of said second thermistor by said first thermistor to a temperature in the given range upon passage of current through said first thermistor of predetermined value and duration, whereby current of predetermined value and duration in said first thermistor will cause said second thermistor to abruptly change its resistance to alter the flow of current through said warning light.

3. In a vehicular electrical system including an alternator, a regulator and a storage battery, a warning light system adapted to be extinguished upon a given current output of said alternator, said system including in combination, a first positive temperature coefficient self-heating thermistor responsive to the output of the alternator to be heated thereby, a warning light connected to the battery, a second thermistor connected in series with said warning light, said second thermistor providing an abrupt increase in resistance within a given temperature range relative to its increase in resistance outside the given range, heat conductive means thermally coupling said first and second thermistors to cause heating of said second thermistor by said first thermistor to a temperature in the given range upon application of current of predetermined magnitude and duration to said first thermistor by said alternator, whereby control current of the predetermined magnitude and duration applied to said first thermistor will cause said second thermistor to abruptly increase its resistance to extinguish the flow of current through said warning light and extinguish the same, said warning light thereby becoming lit when the output of said alternator falls below a predetermined level.

4. A control device responsive to a control current applied thereto to alter the current flowing in a controlled circuit including in combination, a first positive temperature coefficient self-heating thermistor, a first control circuit connected to said first thermistor to apply control current thereto for heating the same, said first thermistor providing an abrupt change in resistance within a first given temperature range relative to its change in resistance outside the given range, a second positive temperature coefficient thermistor providing an abrupt change in resistance within a second given temperature range relative to its change in resistance outside the given range, said second given temperature range being lower than said first given temperature range, said second thermistor being positioned to be heated by said first thermistor to a temperature in the second given range upon application of control current of predetermined value and duration of said first thermistor, a second controlled circuit electrically isolated from said first circuit, and means connecting said second thermistor in said second controlled circuit to control the flow of current therein according to the resistance of said second thermistor, whereby control current of predetermined value and duration applied to said first thermistor will cause said second thermistor to abruptly change its resistance to alter the flow of current in said second controlled circuit.

References Cited by the Examiner

UNITED STATES PATENTS

| 2,036,071 | 3/1936 | Mucher | 338—24 |
| 2,386,903 | 10/1945 | Lutomirski | 219—505 |
| 3,054,978 | 9/1962 | Schmidlin et al. | 338—24 |
| 3,226,600 | 12/1965 | Zielasek | 338—22 X |

FOREIGN PATENTS 557,559  11/1943  Great Britain.

NEIL C. READ, *Primary Examiner.*

D. MYER, *Assistant Examiner.*